US010508694B2

(12) United States Patent
Schröder et al.

(10) Patent No.: US 10,508,694 B2
(45) Date of Patent: Dec. 17, 2019

(54) STARTING ELEMENT, GEARBOX AND DRIVE TRAIN WITH THE START ELEMENT

(71) Applicant: ZF FRIEDRICHSHAFEN AG, Friedrichshafen (DE)

(72) Inventors: Arthur Schröder, Dittelbrunn (DE); Joerg Sudau, Niederwerrn (DE)

(73) Assignee: ZF Friedrichschafen AG, Friedrichshafen (DE)

( * ) Notice: Subject to any disclaimer, the term of this patent is extended or adjusted under 35 U.S.C. 154(b) by 241 days.

(21) Appl. No.: 15/324,492

(22) PCT Filed: Jun. 9, 2015

(86) PCT No.: PCT/EP2015/062801
§ 371 (c)(1),
(2) Date: Jan. 6, 2017

(87) PCT Pub. No.: WO2016/008645
PCT Pub. Date: Jan. 21, 2016

(65) Prior Publication Data
US 2017/0204916 A1 Jul. 20, 2017

(30) Foreign Application Priority Data

Jul. 14, 2014 (DE) .................. 10 2014 213 626

(51) Int. Cl.
*F16D 25/0635* (2006.01)
*F16D 48/02* (2006.01)
(Continued)

(52) U.S. Cl.
CPC ......... *F16D 25/0635* (2013.01); *F16D 13/40* (2013.01); *F16D 48/02* (2013.01);
(Continued)

(58) Field of Classification Search
CPC ............... F16H 45/02; F16H 2045/021; F16H 25/0635; F16H 13/40; F16H 48/02
See application file for complete search history.

(56) References Cited

U.S. PATENT DOCUMENTS 5,755,314 A * 5/1998 Kanda ................. F16D 25/0638
192/113.35
6,832,675 B2 * 12/2004 Kao ..................... F16D 13/583
192/109 A (Continued)

FOREIGN PATENT DOCUMENTS

DE 10 2008 027 070 12/2008
DE 10 2012 201 507 8/2013
(Continued)

Primary Examiner — Stacey A Fluhart
(74) Attorney, Agent, or Firm — Cozen O'Connor

(57) ABSTRACT

A starting element with a friction clutch and a piston configured to actuate the friction clutch. The starting element includes a piston space separated from a residual space of the starting element at least partially by the piston, a first connection constructed such that the piston is acted upon by a hydraulic medium proceeding from one side of the residual space, and a second connection fluidically connected to the piston space. A maximum pressure present at the second connection is equal to and/or less than a pressure present at the first connection.

13 Claims, 6 Drawing Sheets

(51) Int. Cl.
   *F16D 13/40*   (2006.01)
   *F16H 45/02*   (2006.01)

(52) U.S. Cl.
   CPC ............... *F16D 2048/0212* (2013.01); *F16D 2048/0224* (2013.01); *F16H 45/02* (2013.01)

(56) References Cited

U.S. PATENT DOCUMENTS

| | | | |
|---|---|---|---|
| 7,168,545 B2 * | 1/2007 | Ochsenknecht | F16D 7/027 |
| | | | 192/109 F |
| 8,074,778 B2 | 12/2011 | Jayaram et al. | |
| 2007/0181396 A1 * | 8/2007 | Maienschein | F16H 45/02 |
| | | | 192/3.29 |
| 2007/0295572 A1 * | 12/2007 | Samie | F16H 45/02 |
| | | | 192/3.3 |
| 2008/0078638 A1 * | 4/2008 | Degler | F16H 45/02 |
| | | | 192/3.3 |
| 2008/0153129 A1 * | 6/2008 | Wagner | C07K 14/605 |
| | | | 435/68.1 |
| 2009/0127049 A1 * | 5/2009 | Krause | F16H 45/02 |
| | | | 192/3.29 |
| 2009/0152068 A1 * | 6/2009 | Hoffmann | F16H 45/02 |
| | | | 192/3.29 |
| 2013/0161146 A1 | 6/2013 | Hemphill et al. | |

FOREIGN PATENT DOCUMENTS

| | | | | |
|---|---|---|---|---|
| WO | WO-2012153608 A1 * | 11/2012 | | F16H 45/02 |
| WO | WO 2014/097842 | 6/2014 | | |

\* cited by examiner though the two lines 6 and 7 are nevertheless fluidically separated at a point where they cross one another. The fact that oil inlet line 6 and oil outlet line 7 cross one another can be attributed, for example, to a constructional type of oil pump in a gearbox to which the starting element 1 is coupled. It is undesirable for oil inlet line 6 and oil outlet line 7 to cross one another because special steps must then be taken at both the starting element 1 and the gearbox or oil pump, i.e., on the starting element side as well as on the gearbox side, to allow a connection. As further adaptation, a choke is inserted in the starting element 1 and a pressure is choked in the oil inlet line 6. Further, it is necessary to adapt a transmission input shaft in a front region and to adapt a torsion damper flange hub in order to provide sufficient space for lines 6 and 7 and for lines 6 and 7 to cross one another.

STARTING ELEMENT, GEARBOX AND DRIVE TRAIN WITH THE START ELEMENT

CROSS REFERENCE TO RELATED APPLICATIONS

This is a U.S. national stage of application No. PCT/EP2015/062801, filed on Jun. 9, 2015. Priority is claimed on German Application No. DE102014213626.1, filed Jul. 14, 2014, the content of which is incorporated here by reference.

BACKGROUND OF THE INVENTION

1. Field of the Invention

The present invention relates to a starting element, a gearbox and a drivetrain having the starting element.

2. Description of the Prior Art

Starting elements are used in a great variety of forms in the vehicle domain, particularly in the domain of motor vehicles. In these domains, they are often utilized within the framework of a drivetrain in a vehicle of this type for transmitting torque, for example, between a drive unit, i.e. an engine, and a downstream gearbox. This allows the drivetrain to be disconnected so that the engine can continue running, for example, when the vehicle is at a standstill.

Starting elements can also be used in other configurations in the drivetrain of a vehicle. For example, in hybrid drives they can be used between two different drive units or for alternately disconnecting and connecting different drive units with respect to a transmission input shaft. Starting elements can be used in connection with different drive unit technologies, i.e., internal combustion engines and electric motors, and in conjunction with various transmission engineering.

Starting elements usually comprise a friction clutch that often relies on the creation of a frictionally engaging contact between corresponding structural component parts coupled with an input component part and an output component part of the relevant clutch. The starting elements often have a piston or other actuating element for actuating the friction clutch. The piston is usually acted upon by a hydraulic medium to actuate the friction clutch. The piston can be acted upon by the hydraulic medium via different conventional systems.

DE 10 2012 201 507 A1 is directed to a clutch arrangement as starting element, for example, for a drivetrain of a vehicle. A piston is acted upon by a hydraulic medium to actuate the clutch arrangement. The clutch arrangement is a three-line system or three-line type. For this purpose, an interior space of the clutch arrangement is divided into three regions, namely, a piston pressure space, a partial volume and a second volume; in axial direction, the piston pressure space lies between the partial volume and the second volume. The second volume is arranged on the drive side with respect to the piston pressure space. The piston pressure space is separated from the partial volume by a dividing wall and from the second volume by the piston. The piston pressure space is charged with the hydraulic medium via an inlet bore that represents a first of the three lines or channels. To enable a movement of the piston, the second volume is fluidically connected via a further feed channel. The feed channel thus allows hydraulic medium to flow in and out in case of movement of the piston and accordingly serves to compensate the corresponding volume. An inlet area is connected to an inlet for the hydraulic medium via some absent teeth in an inner toothing and a corresponding outer toothing, respectively, of a transmission input shaft. Not only is the second volume supplied with the liquid medium via the inlet area resulting from the missing teeth, the residual space is also fluidically connected via the inlet area and oil guiding lines integrated in a bearing. An inlet bore to the piston pressure space is separated from the inlet area by a seal. Accordingly, the inlet area is the second line. The liquid medium can exit the partial volume via corresponding oil guiding channels in a bearing and an outlet area. The outlet area is formed between a lower hub and a pump hub and is the third line. Accordingly, the three-line system is relatively complicated in term's of design, and a dividing wall and additional sealing elements are required to separate three spaces from one another.

FIG. 6 shows a schematic cross-sectional view through a conventional starting element 1. In starting element 1, a piston 3 can be fluidically connected by a two-line system, i.e., via only two oil lines, namely, an oil inlet line 6 and an oil outlet line 7. An interior space 2 of the starting element 1 is divided by the piston 3 and dividing wall 8 into a piston pressure space, a residual space 5, and a further volume 9. The residual space 5 is fluidically connected to the piston pressure space 4 via a choke 10. The object of the choke 10 is to connect the oil inlet line 6 to the oil outlet line 7. The oil inlet line 6, which can also be designated as an inlet, opens into the piston pressure space, and the oil outlet line 7, which can also be designated as an outlet, opens into the residual space 5. Lines 6 and 7 cross one another so that the piston pressure space 4 can be connected to the oil inlet line 6 and the residual space 5 can be connected to oil outlet line 7. Naturally, the two lines 6 and 7 are nevertheless fluidically separated at a point where they cross one another. The fact that oil inlet line 6 and oil outlet line 7 cross one another can be attributed, for example, to a constructional type of oil pump in a gearbox to which the starting element 1 is coupled. It is undesirable for oil inlet line 6 and oil outlet line 7 to cross one another because special steps must then be taken at both the starting element 1 and the gearbox or oil pump, i.e., on the starting element side as well as on the gearbox side, to allow a connection. As further adaptation, a choke is inserted in the starting element 1 and a pressure is choked in the oil inlet line 6. Further, it is necessary to adapt a transmission input shaft in a front region and to adapt a torsion damper flange hub in order to provide sufficient space for lines 6 and 7 and for lines 6 and 7 to cross one another.

SUMMARY OF THE INVENTION

There is a need to improve a starting element in such a way that its construction is simplified and the quantity of individual parts is reduced and in such a way that a connection to further components, for example, to an oil pump or a gearbox, is facilitated and adaptations to the oil pump and/or gearbox can at least be reduced or even completely omitted.

Embodiment examples relate to a starting element with a friction clutch and with a piston which is configured to actuate the friction clutch. The starting element also comprises a piston space that is separated from a residual space of the starting element at least partially by the piston. The starting element further comprises a first connection, which is constructed such that the piston is acted upon by hydraulic medium proceeding from one side of the residual space, and a second connection, which is fluidically connected to the piston space. A maximum pressure present at the second connection is equal to and/or less than a pressure present at the first connection.

A simpler construction of the starting element can be achieved in some embodiment examples in that the piston separates the piston space from a residual space, and the second connection opens into the piston space, and the first connection via which a pressure can be provided, which is greater than the pressure provided via the second connection, opens into the residual space. Further elements or dividing walls for partitioning off a third space, for example, can be dispensed with. Further, it is also possible to facilitate a connection of the starting element to other components. For example, a connection to a gearbox and/or an oil pump may be possible without requiring a special adaptation to the gearbox and/or the oil pump or to connections or lines thereof which are fluidically connected to the first connection and second connection of the starting element.

The first connection can be arranged, for example, radially outside of the second connection. This arrangement may be at least partially, for example, in a region in which the connections are arranged substantially parallel to an axis of rotation of the starting element. In addition or alternatively, the two connections also arranged in such a way that their projections are arranged in a nonintersecting manner around an axis of rotation of the starting element. The two connections can possibly be prevented from crossing one another at least through one of the steps. Also, a possible crossing of lines in a downstream component, for example, the gearbox or the oil pump or a hydraulic pump, can be prevented. For example, the second connection can be arranged radially inside of the first connection at least until it changes direction to open into the piston space.

The starting element may be, for example, a two-line system comprising the first connection and the second connection. Further lines and connections can possibly be dispensed with in that the starting element can comprise exclusively the first connection and the second connection to guide the hydraulic medium or another liquid medium into and out of an interior space of the starting element. In this way, a construction can possibly be simplified and/or a design can be configured more compactly to save on installation space.

Additionally or alternatively, the starting element can comprise a preloading structure. The preloading structure can be configured to preload the piston against a direction in which the hydraulic medium acts on the piston via the first connection. In some embodiment examples, this can allow the clutch to adopt either an "open" or "closed" state without the piston being acted upon by a hydraulic medium. Accordingly, it may be possible to dispense with any lines and/or connections for displacing the piston opposite a first impingement direction.

Additionally or alternatively, the starting element can comprise a sealing element. This sealing element can be configured to seal the piston space between the piston, which is movable in axial direction, and a component part, which is immovable in axial direction relative to the residual space of the starting element. Accordingly, in some embodiment examples an exchange of fluid between the residual space and the piston space can at least be limited. Naturally, the sealing element can either directly contact the piston and/or the component part or achieve a sealing effect. Of course, the sealing element can also achieve the sealing effect indirectly between the piston and the structural component part, and at least a further structural component part or a further element can be arranged between the sealing element and the piston and/or between the piston and the structural component part which is immovable in axial direction. The structural component part, which is immovable in axial direction can be, for example, a housing or a plate fastened to the housing. Axial immovability can mean, for example, a bearing support or arrangement of the structural component part. Although the structural component part is immovable in axial direction, it may happen that the structural component part deforms in an axial direction under unfavorable circumstances, for example, as a result of a swelling of the housing which will be described more exactly below.

It is possible that the sealing element can comprise the preloading structure. Accordingly, a sealing function and a preloading function can possibly be achieved by an individual structural component part, and separate component parts can be reduced. An example of a sealing element which can also perform a preloading function is a plate spring.

For example, the first connection can be an inlet and the second connection can be an outlet. In some cases, the hydraulic fluid can be introduced or pumped into the residual space via the inlet which opens into the residual space. The hydraulic fluid can then exit the starting element again via the outlet which is connected to the piston space. In order to make this possible, it may be necessary that the hydraulic medium arrives in the piston space from the residual space.

To enable an exchange of fluid between the piston space and the residual space, the starting element can include a choke connection between the piston space and the residual space. The choke connection can be configured to allow a smaller flow quantity to pass through than that which can be supplied via the first connection or the inlet with pressure ratios remaining the same. Accordingly, although an exchange of fluid is allowed between the residual space and piston space, it can be possible for a pressure to be built up in the residual space in order to move the piston in axial direction.

For example, the choke connection may be an opening in the piston. As the case may be, it may also be possible to arrange a choke connection or a choke in the piston or to introduce a corresponding opening in the piston without structural changes to other structural component parts. Additionally or alternatively, the choke connection or the choke can also be arranged in at least one of the seals or the sealing element.

To actuate the clutch, the piston in many cases is centered on a structural component part in radial direction and is supported so as to be movable in axial direction. For example, the piston can be supported for this purpose on a cover hub connected to a housing of the starting element so as to be fixed with respect to rotation relative to it. Accordingly, the piston can possibly be supported by a smaller quantity of individual structural component parts. Additionally or alternatively, the piston can also be supported at the housing via leaf springs.

Alternatively, a housing or a housing shell of the starting element can be decoupled from the structural component part on which the piston is guided in radial direction and supported to be movable in axial direction. Accordingly, it may be possible that a deformation of the housing has no influence on a location or a position of the piston. A deformation of the housing, which may also be referred to, for example, as a housing swelling, may in some cases be brought about by a pressure in the hydraulic medium and/or an increase in rotational speed.

For example, the structural component part on which the piston is supported can be a head piece supported radially outwardly of and so as to be rotationally movable at an output component part, for example, a hub of a vibration damper of the starting element. Accordingly, it is possible to prevent an occurrence of relative rotational speeds between the piston and the structural component part on which it is supported, also when the clutch is open. Sealing between the two structural component parts may possibly be simplified in this way.

Additionally or alternatively, the piston can also be rotatably movably supported at the structural component part on which it is supported so as to be movable in axial direction. For example, the structural component part can be an output component part, for example, a hub of a vibration damper of the starting element or a transmission input shaft. Accordingly, it can be possible to dispense with a head piece as additional structural component part for supporting the piston. Accordingly, in some embodiment examples a bearing support can be possible directly on a transmission input shaft.

Embodiment examples are further directed to a starting element in which a contact spring is arranged between a piston and a friction clutch to transmit torque from the piston to the friction clutch. The contact spring has a greater contact radius and/or friction radius at increasing piston pressure. Due to the fact that the contact spring obtains a greater contact radius and/or friction radius with increasing piston pressure, a torque transmission can possibly be further improved, for example, through a greater average contact and/or friction radius at a friction lining or a lining plate. Further, a layout of the starting element can possibly be simplified over conventional contact springs that obtain a smaller friction radius with increasing piston pressure. This can possibly be related because a directly proportional relationship between a piston pressure and a friction radius can be taken into account more easily computationally.

For example, the contact spring can also be implemented in one of the above-described embodiment examples having substantially two connections. Alternatively, the contact spring can also be used in other starting elements in which the piston is adjusted in some other manner, for example, with a three-line system or a two-line system in which the two connections cross one another one another.

Embodiment examples also relate to a gearbox and/or a drivetrain with the starting element according to at least one of the described embodiment examples.

The embodiment examples disclosed in the preceding description, the subsequent claims and the accompanying figures and features thereof may be of importance and be implemented, both individually and in any combination, for the realization of an embodiment example in their various implementations.

DETAILED DESCRIPTION OF THE PRESENTLY PREFERRED EMBODIMENTS

Figure 1:
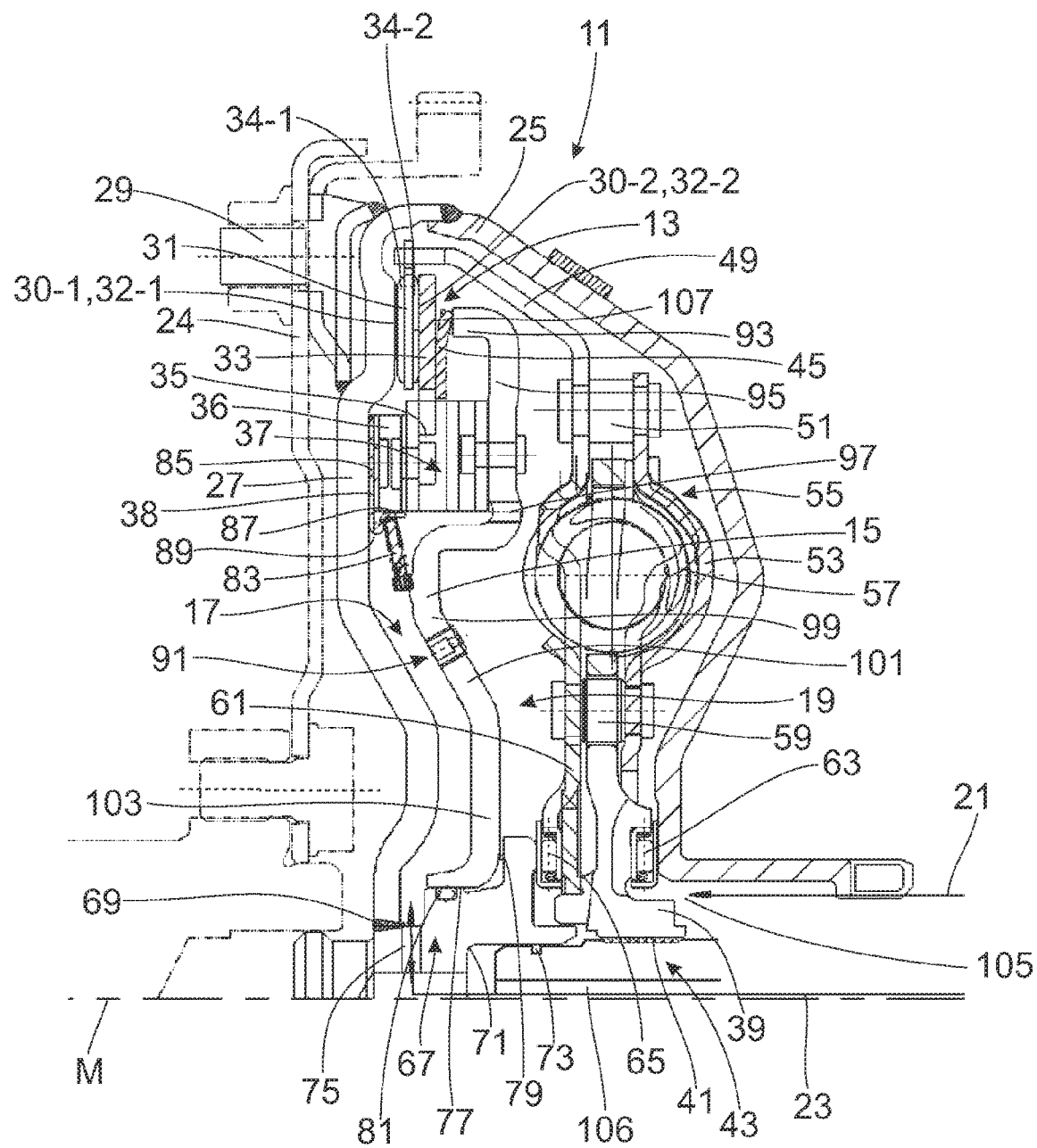
FIG. 1 is a schematic cross-sectional view through a starting element.

In the following description of the accompanying drawings, like reference numerals denote like or comparable components. Further, summarizing reference numerals are used for components and objects which occur several times in an embodiment example or in a drawing but which are collectively described with respect to one or several features. Components or objects designated by like or summarizing reference numerals may be implemented identically but also differently with respect to individual features, several features or all features, e.g., dimensioning, unless otherwise explicit or implicit from the description.

FIG. 1 shows a schematic cross-sectional diagram through a starting element 11 according to one embodiment. The starting element 11 includes a friction clutch 13 and a piston 15 which is formed to actuate the friction clutch 13. The starting element 11 further comprises a piston space 17, which is at least partially separated from a residual space 19 of the starting element 11 by the piston 15. The piston 15 can be acted upon via a first connection 21 by hydraulic medium proceeding from one side of the residual space 19. A second connection 23 is fluidically connected to the piston space 17 and opens into it. A maximum pressure present at the second connection 23 is equal to and/or less than a pressure present at the first connection 21.

The starting element 11 further comprises a housing which, in the present instance, is constructed as a two-part housing with a first housing shell 25 and a second housing shell 27. The second housing shell 27 may also be referred to as engine-side cover of starting element 11. The two housing shells 25 and 27 are connected to one another via a weld joint. The housing is filled with the hydraulic medium. The starting element 11 is accordingly a wet starting clutch or a clutch.

The second housing shell 27 and, therefore, the housing serve as input component part in the starting element 11. To this end, the second housing shell 27 has a weld stud 29 for fastening to a flexplate 24 or a flywheel of a drive unit, not shown, for example, an engine, or another component of the drivetrain. Alternatively, a pin or other fastening structure can be implemented in place of the weld stud 29 to fasten the starting element 11.

At an inner surface of the housing shell 27, the friction clutch 13 comprises a first friction surface 30-1 which is in frictional engagement, or can be brought into frictional engagement, with a corresponding second friction surface 32 of an outer plate 31. The outer plate 31 is coated with a friction lining 34-1 at which the second friction surface 32 is formed. In contrast, the first friction surface 30-1 is formed directly at the inner surface of the housing, i.e., is molded out as steel surface, for example, when the housing or housing shells 25 and 27 are likewise made of steel. At a side remote of the inner surface of the housing, the outer plate 31 has a further friction lining 34-2 which forms a further, second friction surface 32-2 at an upper surface. The second friction surface 32-2 is in frictional engagement with an inner plate 33 or can be brought into frictional engagement with the latter via a corresponding first friction surface 30-2. The inner plate 33 and the outer plate 31 are implemented as substantially disk-shaped steel component parts and are corresponding, at least partially disk-shaped component parts at which the first friction surface 30 and second friction surface 32 are arranged in the region of the disk-shaped portions. Of course, in other embodiment examples the friction linings can also be provided at the other respective structural component parts.

The outer plate 31 is coupled with an output component part 39 of the starting element 11 at least substantially so as to be fixed with respect to rotation relative to it. More precisely, the output component part 39 is a lower hub of a vibration damper 55, which is described more exactly in the following, can be coupled by positive engagement to a transmission input shaft 43 via an inner toothing 41. The transmission input shaft 43 has an outer toothing corresponding to the inner toothing. The inner plate 33 is connected via a feed component part 37 to the housing or housing shell 27 so as to be fixed with respect to rotation relative to it. The piston 15 serving as pressing element makes contact with the inner plate 33 via a contact spring 45 to provide the frictional engagement between the friction surfaces 30 and 32.

In some further embodiment examples, not shown, a connection can also be made between the inner plate and the housing in a different manner, for example, directly, without the feed element, or also indirectly via other components. In some further embodiment examples, not shown, the friction clutch can also be constructed in a different manner, for example, as a multi-disk clutch or multiplate clutch.

To allow torque to be transmitted from the housing or housing shell 27 serving as drive component part to the inner plate 33, the latter has a portion at which a driver surface 35 is formed in each instance at a side surface. The inner plate 33 engages the feed component part 37 by the driver surface 35 such that when the feed component part 37 rotates, the inner plate 33 is also set in rotation. In this embodiment example, a connection component part 36 serves to connect the feed component part 37 such that it is substantially fixed with respect to relative rotation, this connection component part 36 being mechanically connected via a sealing element contact plate 38 to the housing shell 27 so as to be fixed with respect to rotation relative to it. In some embodiment examples, the sealing element contact plate 38 may only be clamped in or is integrally formed with the housing shell 27 or connected to the latter. For example, a rivet joint or weld joint may be used for the connection. However, other joining techniques may also be used in other embodiment examples. The connection component part 36 can have, for example, a plurality of leaf springs that connect to the feed component part 37 such that it is fixed with respect to relative rotation. In some further embodiment examples, not shown, these leaf springs can also serve to support the piston 15. To this end, the connection component part 36, or leaf springs thereof, is mechanically connected via further rivet joints to the feed component part 37 so as to be fixed with respect to rotation relative to it. In this case too, other joining techniques can also be used. The feed component part 37 can be connected, for example, riveted, to the piston 15. Possibly, riveting or connecting can also be dispensed with.

The torque is transmitted from the housing shell 27 as input component part via the connection component part 36, which can include a plurality of leaf springs, to the feed component part 37, which may also be referred to blade-shaped inner plate carrier, and therefore to a feed surface of the feed component part 37. The torque is transmitted to the inner plate 33 through the engagement of the inner plate 33 with the feed component part 37. When the clutch is closed, the torque can be transmitted via frictional engagement from the inner plate 33 to the outer plate 31.

The outer plate 31 also has a portion 47 that engages with an outer plate carrier 49 via a corresponding driver surface and that can absorb the torque transmitted from the inner plate 33 to the outer plate 31 in case of frictional engagement. The outer plate carrier 49 is coupled with a cover plate 53 of a single-stage vibration damper 55 via a spacer piece 51 and a spacer piece 59. In some embodiment examples, the coupling can also be carried out only via one of the two spacer pieces. The vibration damper 55 has a plurality of spring elements 57 arranged along a circumference of the output component part 39, which may also be referred to as a hub disk. The hub disk and hub 39 are constructed as one structural component part but may also be produced in two or more parts. The cover plate 53 of the vibration damper 55 is connected to the output component part 39 radially inwardly of the spring element 57 via a further spacer piece 59. A further cover plate 61 is arranged on a side of the output component part 39 facing the housing shell 27. The outer plate carrier 49 merges in one piece with the second cover plate 61 and serves as second cover plate 61. Cover plates 53 and 61 form a spring channel for receiving the spring elements 57. The spring elements 57 can be helical springs, for example. Of course, other spring elements or other vibration dampers, for example, multistage vibration dampers, can also be used in other embodiment examples of the starting element.

The torque is transmitted from the outer plate 31, via the outer plate carrier 49 and spring elements 57 on cover plates 53 and 61 to output component part 39 or the hub disk, from where it is conveyed to the transmission input shaft 43.

The output component part 39 is supported relative to the housing shell 25 on a side remote of a drive by a bearing 63, which is a needle thrust bearing, so as to be rotatable with respect to an axis of rotation M. A different thrust bearing, for example, a plain bearing or a different rolling element bearing, for example, a roller bearing, ball bearing or the like, can also be used as bearing 63. Bearing 63 comprises at least one oil pocket which is formed in order to fluidically connect an interior space of the housing to the first connection 21. In other words, the first connection 21 opens into the residual space 19 via bearing 63. At a side of the output component part 39 remote of the bearing 63, the output component part 39 is supported via the cover plate 61, which is supported via a further bearing 65 relative to a cover hub 67 to be rotatable around the axis of rotation M. The further bearing 65 can be formed analogous to bearing 63 or differently than bearing 63 and is supported in the left-hand cover plate 61. Alternatively, the bearing 65 can be supported in or at the hub 39 and/or the bearing 63 in cover plate 53.

The cover hub 67 is connected via a weld joint 69 to the housing shell 27 so as to be fixed with respect to rotation relative to it. In some further embodiment examples, not shown, the connection can be made in some other manner, for example, a rivet joint or the like. At a radially inwardly directed surface, the cover hub 67 has a step 71 by which the cover hub 67 is arranged at least partially radially outwardly relative to the transmission input shaft 43 and at least partially overlaps the latter in axial direction. A seal 73 is arranged in radial direction between the cover hub 67, or the step 71 thereof, and the transmission input shaft 43.

The cover hub 67 further comprises at least one oil bore 75 formed to join the piston space 17 hydraulically to the second connection 23. The second connection 23 opens into the piston space 19 via the oil bore 75. In some case, only one bore or a plurality of bores which are spaced apart from one another in circumferential direction can also be provided for this purpose. Accordingly, this is a short cover hub 67 which is welded in and has a bore or oil bore 75 arranged on the left-hand side of the piston 15.

At a surface that is directed radially outward, the cover hub 67 has a bearing portion 77 for the piston 15. The piston 15 can move in axial direction at this bearing portion 77. Its axial movability is limited at least in direction of the vibration damper 55 by an axial stop 79. A seal 81 is arranged in radial direction between the piston 15 and the cover hub 67 in a circumferential groove of the cover hub 67. Seal 81 seals the piston space 17 between the piston 15 and the cover hub 67 relative to the residual space 19.

The piston space 17 is further defined by a radially inner portion of the housing shell 27. The piston space 17 is sealed and limited radially outwardly via a sealing element 83 that also serves as a preloading structure and can also be referred to as piston space seal. In the starting element 11 in FIG. 1, a plate spring is used as piston space seal and, besides a sealing function, also serves for a piston return pressure. The plate spring or another spring used as an alternative can have a spring force corresponding to a pressing force of the first connection 21 at a speed of at least 1400 RPM. For example, the preloading structure can hold the friction clutch 13 open at least up to a speed of 1400 RPM. Further, the preloading structure or a spring that seals the piston space 17 on the left-hand side of the piston 15 has a spring force that is greater than a maximum possible compressive force of the second connection 23. It is also possible for the preloading structure to have different dimensions.

The sealing element 83 is supported on a side remote of the housing shell 27 at a faced or unmachined surface of the piston 15. The piston 15 and sealing element 83 touch each other approximately at a radial height just below a center point around which the spring elements 57 are arranged. In some further embodiment examples, not shown, the sealing element can also be arranged at a greater or lower radial height. Additionally or alternatively, the sealing element can be implemented, for example, as an elastomeric seal, a membrane, or the like in some further examples, not shown. Possibly, the sealing element can then also perform only the sealing function and a separate structural component part can be used to serve as preloading structure. This can also be a spring, for example.

The sealing element 83 contacts the sealing element contact plate 38 by the preloading structure on the opposite side in axial direction. The sealing element contact plate 38 has a first leg 85 arranged in axial direction between the housing shell 27 and the connection component part 36. On the radially outer side, the leg 85 is flush with the connection component part 36. In some further embodiment examples, not shown, the leg can be overhung or underhung. Radially inwardly, the first leg 85 has a U-profile-shaped concavity 89 at which a second leg 87 is arranged in axial direction. The second leg 87 at least partially conforms to a radially inwardly directed surface of the feed element 36. The second leg 87 is arranged substantially at a 90-degree angle to the first leg 85 and at a greater radial height than a portion which is located farthest radially inwardly of the concavity 89. The sealing element 83 is centered at the concavity 89. This results in a contact surface for the sealing element 83 at a surface of the concavity 89 directed in axial direction. The concavity 89 can also possibly be shaped in such a way that the contact surface has only one axial direction component, but forms an angle between 0° and 45° with a radial direction, i.e., can be inclined. In some further embodiment examples, not shown, the two legs can also form a different angle, for example, an angle between 120° and 70°. The sealing element 83 is supported at the second leg 87 and the contact surface of the concavity 89. In some further embodiment examples, not shown, the sealing element contact plate can also have a different shape, for example, longer or shorter legs, or can even be omitted. The housing shell can then have a contact surface for the sealing element.

In its radially outer region, the piston 15 has a clutch operating region 93 which is arranged substantially parallel to an axial direction. Adjoining the latter is a feed element receiving portion 95 which is arranged substantially parallel to a radial direction. In the feed element receiving portion 95, the piston 15 has at least one bore 97 or elongated hole formed to allow oil to pass into other areas of the residual space 19. Radially inwardly of bore 97, the piston 15 has a portion that is angled in direction of the housing shell 27 and is arranged substantially parallel to the axial direction. Proceeding from this portion, the piston 15 extends along a bend 99 and an inclined portion 101 to a radially inner region 103 that is arranged substantially parallel to the radial direction. With regions 99, 101 and 103, the piston 15 substantially follows a shape of the housing shell 27 so that the piston space 17 maintains a uniform or consistent extension in an axial direction.

Accordingly, the piston 15 separates the piston space 17 from the residual space 19. No further dividing walls or separators, which are arranged substantially parallel to the piston 15, are provided. The piston space 17 is a region in the interior of the housing arranged closest to the drive unit at least radially inside in axial direction. No further spaces, other spaces filled with hydraulic fluid or with air, or partitioned volumes are provided. Spaces of this kind can possibly be provided in some embodiment example, not shown. The piston space 17 is located in axial direction at least with its radially inner region between a housing shell 27 arranged on the drive side and the piston 15. The residual space 19 is the other remaining portion of the interior of the housing that is enclosed by housing shells 25 and 27 and is not the piston space 17. The residual space 19 is arranged next to the piston space 17 in axial direction at least with its radially inner region and is limited radially outwardly of the sealing element 83 by piston 15, the housing shell 25 arranged on the output side, and the housing shell 27. The residual space 19 has a volume that is greater by at least a factor of two than a volume of the piston space 17. For example, the piston space 17 can also be defined as a region in an interior space of the starting element 11 in which there is no vibration damper arrangement. A vibration damper can be arranged in an analogous manner in the residual space 19 in some embodiment examples.

However, the piston space 17 is not completely separated from the residual space 19 fluidically. The residual space 19 and the piston space 17 are fluidically connected via a choke connection 91. A choke is arranged at the piston 15 for this purpose. As choke connection 91, either a separate structural component part can be inserted into the piston 15 or a corresponding opening can be introduced directly in the piston 15. Alternatively, the choke connection 91 or a corresponding choke function can also be achieved via one of the two seals. The opening or the choke connection 91 is formed to let a smaller flow quantity pass through it than that which can be supplied via the first connection 21 with pressure ratios remaining the same. The choke connection 91 can possibly have a bevel on a side on which the hydraulic fluid exits. Accordingly, noise can be reduced. The choke connection 91 is arranged in the inclined portion 101 of the piston 15. In FIG. 1, the choke connection 91 is arranged approximately at a radial height up to which the spring element 57 projects radially inward. In some further embodiment examples, not shown, the choke connection can be arranged at another location of the piston or even in another structural component part, for example, the sealing element, the preloading structure, or the like. In some further embodiment examples, not shown, a plurality of choke connections arranged adjacently in circumferential direction can be provided. A hydraulic fluid can be, for example, oil, a transmission fluid and/or another medium.

To actuate the friction clutch 13, the hydraulic medium is pumped into the residual space 19 via the first connection 21, which is an inlet, and a pressure in the piston space 17 is reduced simultaneously via the outlet 23 which can also be referred to as line. The pressure in the residual space 19 can accordingly be increased. To this end, the first connection 21 is fluidically connected to a pump, not shown, for example, an oil pump or a transmission fluid pump or customer oil pump in the gearbox. The oil pressure conditions described in detail in the following can be present at the pump, for example. A pressure or a flow quantity in the first connection 21, which can also be designated as P1 line, cannot be controlled or adjusted and always supplies a maximum oil pressure provided by the oil pump. In this respect, a maximum oil pressure made available by the oil pump can be dependent upon rotational speed. The hydraulic medium can exit again from the interior of the housing, particularly the piston space 17, via the second connection 23 which may also be designated as P2 line and which is an outlet. Although the second connection 23 is referred to as outlet, this does not exclude the possibility that hydraulic fluid possibly enters the piston space 17 through the second connection 23.

Accordingly, the starting element 11 is a two-line system which is supplied with a medium exclusively via the two connections 21 and 23 in contrast to three-line systems. In order to exit again via the second connection 23, the hydraulic medium can enter the piston space 17 from the residual space 19 via the choke connection 91, specifically exclusively via the latter. However, in view of the fact that the choke connection 91 only allows an amount to pass through that is smaller than the amount pumped into the residual space 19 via first connection 21, piston 15 can nevertheless be acted upon by a pressure resulting in an axial displacement of the piston 15 in direction of the housing shell 27. The second connection 23 is likewise fluidically connected to the pump. A pressure or flow amount in the second connection 23 can be controlled and can take on a value from 0 bar to a value corresponding to a maximum pressure that can be provided via the first connection 21 at the same time. In other words, a pressure that is present at the second connection 23, which can be designated as P2, cannot be greater than a pressure which is present at the first connection 21, which is designated as P1.

The first connection 21 leads through an input region 105 via bearing 63 to the residual space 19 which can also be designated as a toroidal space. Accordingly, the P1 pressure is present in the residual space located on a right-hand side of the piston 15. The second connection 23 comprises a bore 106 arranged in the transmission input shaft 43 to be concentric to an axis of rotation. This bore 106 extends farther than the first connection 21 in axial direction until the piston space 17, which is arranged on a left-hand side of the piston 15 or up to the oil passage opening 75, which can also be designated as a piston space supply line.

The first connection 21 is arranged radially outwardly of the second connection 23. As a result, the two connections 21 and 23 can be connected to corresponding connections of the pump without the oil lines having to cross one another in the gearbox or at some other place. The connections 21 and 23 are arranged in such a way that their projections also do not cross around the axis of rotation M or are arranged so as not to cross one another.

An actuation of the friction clutch 13 can be, for example, an opening and/or a closing or an increase and/or decrease in a pressure between the outer plate 31 and inner plate 33. The friction clutch in FIG. 1 is a normally open clutch. Accordingly, as a result of hydraulic medium impinging on the piston 15, the piston 15 is moved in axial direction toward the housing shell 27 arranged on the drive side. Accordingly, the clutch 13 is closed or, if it is already closed, a pressure between the inner plate 33 and outer plate 31 increases. In so doing, a volume of the piston space 17 is also reduced and a volume of the residual space 19 increases.

When the piston 15 moves in direction of the housing shell 27, it deforms the contact spring 45. The contact spring 45 is arranged in axial direction between the inner plate 33, which can also be referred to as steel plate, and the piston 15. In radial direction, the contact spring 45 is centered at the feed component part 37 and is arranged approximately at the height of the inner plate 33. The contact spring 45 is a plate spring, which can also be referred to as progressive contact plate spring. The contact spring 45 is configured and arranged to roll along a rolling surface 107 facing the contact spring 45 with increasing piston pressure or with increasing axial displacement of the piston 15 in direction of the housing shell 27. The rolling surface 107 is located at a side of the inner plate 33 facing the piston 15. In an unloaded state, the contact spring 45 can have a curved cross section and can only contact the rolling surface 107 by a radially inner area. With increasing piston pressure, the contact spring 45 is deformed so that it also contacts the rolling surface 107 in a region located farther radially outward. Accordingly, with increasing piston pressure, a mean radius at which the plates 31, 33 or friction linings 34 or friction surfaces 30, 32 thereof rub against one another becomes larger in order to transmit torque. In other words, a lining friction radius can be increased and can accordingly contribute to an increasing friction coefficient characteristic. In some further embodiment examples, not shown, the contact spring can also be arranged in a different manner, can have a different spring characteristic and/or can even be omitted. The contact spring 45 can possibly also be used in other starting elements or clutch arrangements that differ from the starting element 11 described herein.

In order to close the friction clutch 13, which can be a converter clutch, for example, the first connection 21 is acted upon by pressure. To open the friction clutch, a pressure which is controllable can be adjusted in the second connection 23. In this way, the hydraulic medium can flow out of the residual space 19 via the choke connection 91 into the piston space 17 and flow out from there via the second connection 23. The piston 15 can then be pressed into an initial position again via the preloading structure of the sealing element 83 when it is no longer acted upon by pressure or hydraulic medium, so that the friction clutch 13 opens or at least moderates a pressing pressure.

The starting element 11 accordingly has a simpler construction compared to starting elements with a conventional piston-oil control and can be better adapted to an oil pump. In conventional starting elements, a piston-oil control is usually carried out either via a separate piston pressure space, i.e., with a three-line principle and piston space or piston pressure space with its own oil line, or via the same piston space, but one which is outfitted with an additional choke and/or stop. The oil lines are usually guided so as to be crossed with respect to the corresponding connections in the gearbox. With starting element 11, the connections 21 and 23 can be guided without crossing one another. It is possible, although not necessary for reasons relating to actuation, that a pressure supplied via the first connection 21 can be limited at least temporarily, for example, when the starting element 11 is operated with open clutch. Accordingly, a swelling of the housing which is to be described more precisely hereinafter can possibly be prevented or reduced as far as possible when the clutch is open.

Figure 2:
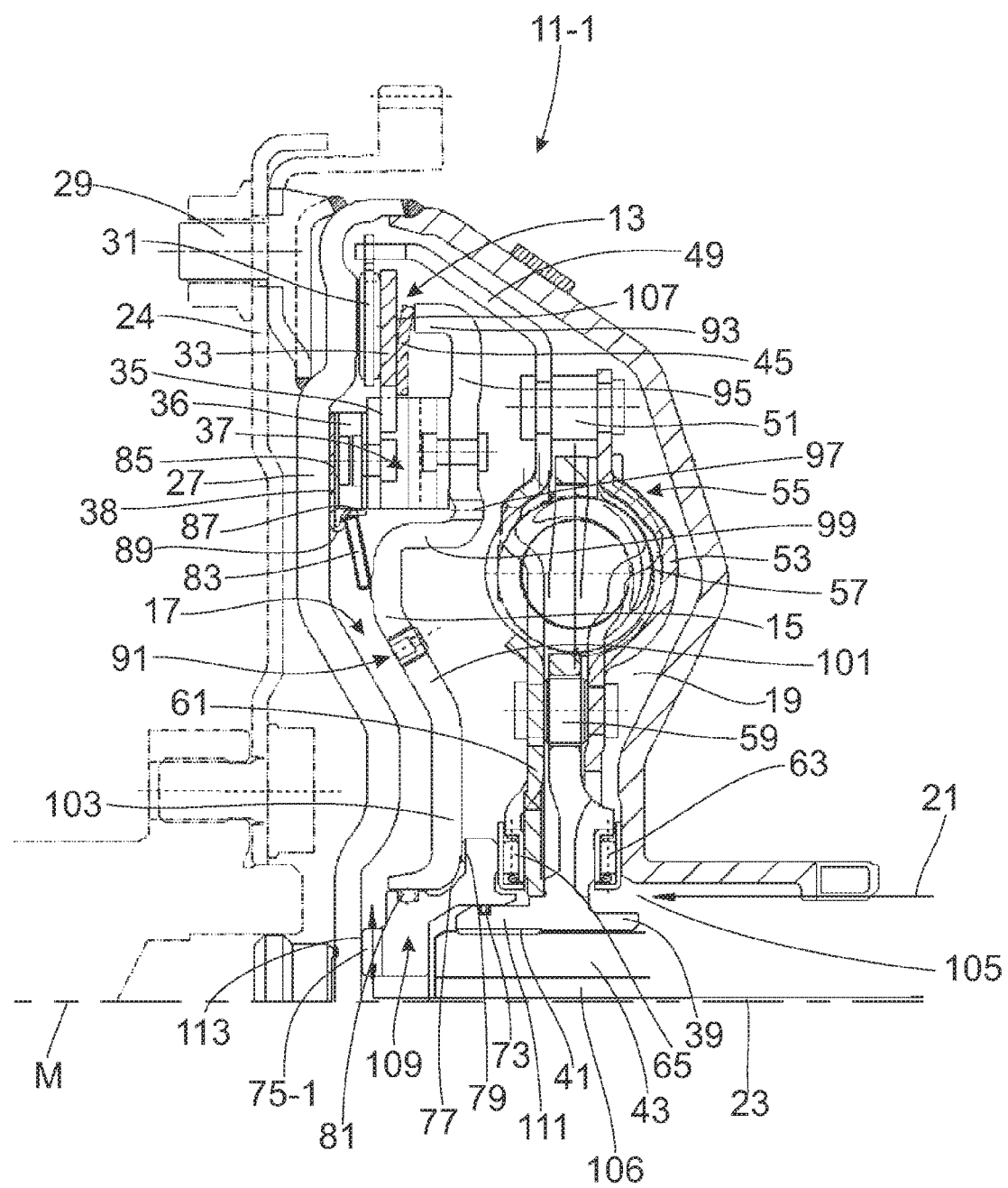
FIG. 2 is a schematic cross-sectional view through a starting element.

FIG. 2 shows a schematic cross-sectional diagram through a starting element 11-1 according to a further embodiment, which is substantially similar to starting element 11. Like or similar structural component parts are designated by like reference numerals. Only some differences will be described in the following.

Starting element 11-1 differs from starting element 11 in the bearing support of the piston 15. In starting element 11-1, piston 15 is not supported at a cover hub connected to the housing shell 27, but rather on a loose head piece 109. The loose head piece 109 is not connected or welded to the housing shell 27. The head piece 109 is rotatably supported via bearing 65 and output component part 39 itself radially outwardly of a flange 111 of the output component part 39 which extends in axial direction to a side of the output component part 39 facing the engine. In radial direction, the seal 79 is arranged between the flange 111 and the head piece 109. On a side remote of the flange 111 in axial direction, the loose head piece 109 abuts the housing shell 27. An axial bearing retention can be achieved by means of the head piece 109. At one end face 113, the head piece 109 has at least one recess which is open in direction of the housing shell 27 and penetrates the head piece 109 in radial direction. This at least one recess forms an oil passage opening 75-1 which fluidically connects the second connection 23 to the piston space 17. The head piece 109 can possibly have a plurality of recesses of this kind spaced apart from one another in circumferential direction. Radially inwardly, the head piece 109 is relieved such that the transmission input shaft 43 can retain its original shape and remain unchanged.

Accordingly, the head piece 109 is separated or decoupled from the housing shell 27. A swelling compensation can be brought about in that the piston 15 can be supported on a structural component part independent from the housing shell 27 and from the housing in its entirety. A deformation of the housing that can also be referred to as a housing swelling, can possibly be brought about by a pressure in the hydraulic fluid. The housing or housing shells 27 and 25 can deform outwardly through the acting pressure. In the embodiment example in FIG. 1, a deformation of the housing shell 27 could lead under especially unfavorable conditions to a movement in axial direction being transmitted via the weld connection 69 to the cover hub 67 and, accordingly, also to the piston 15. In order to prevent this, the pressure in the first connection 21 can possibly be limited or choked. Under unfavorable conditions, the stop 79 can prevent the piston 15 from compensating or completely compensating the axial displacement of the cover hub 67 on which it is supported in spite of the axial movability of the piston 15. This can change the actuating behavior of piston 15, for example. The friction clutch 13 can possibly be partially closed earlier than planned when the piston 15 is acted upon by hydraulic medium.

By supporting the piston 15 on the head piece 109, which is separated from the housing shell 27 such that a deformation of the housing shell 27 axially outwardly does not result in the head piece 109 also being displaced axially outwardly, i.e., the cover hub is formed as loose head piece 109, the housing swelling has no effect on a plate air clearance or an operating point in which the clutch 13 is opened. Since a swelling compensation is possible, a pressure supplied via the first connection 21 need no longer be limited and the pressure provided by the oil pump can be permanently transmitted to the starting element 11-1. In other words, through the described linking of the connections and the axial separation of the structural component part on which the piston 15 is supported, an oil pressure supplied via the gearbox can be utilized without modification. In some embodiment examples, a disk 122 shown in dashed lines can optionally be arranged or installed in axial direction between the housing shell 27 and the flange 111-3. Accordingly, it is possible that an axial thrust of the vibration damper 55 on the piston 15 can at least be limited or can even be completely eliminated.

Figure 3:
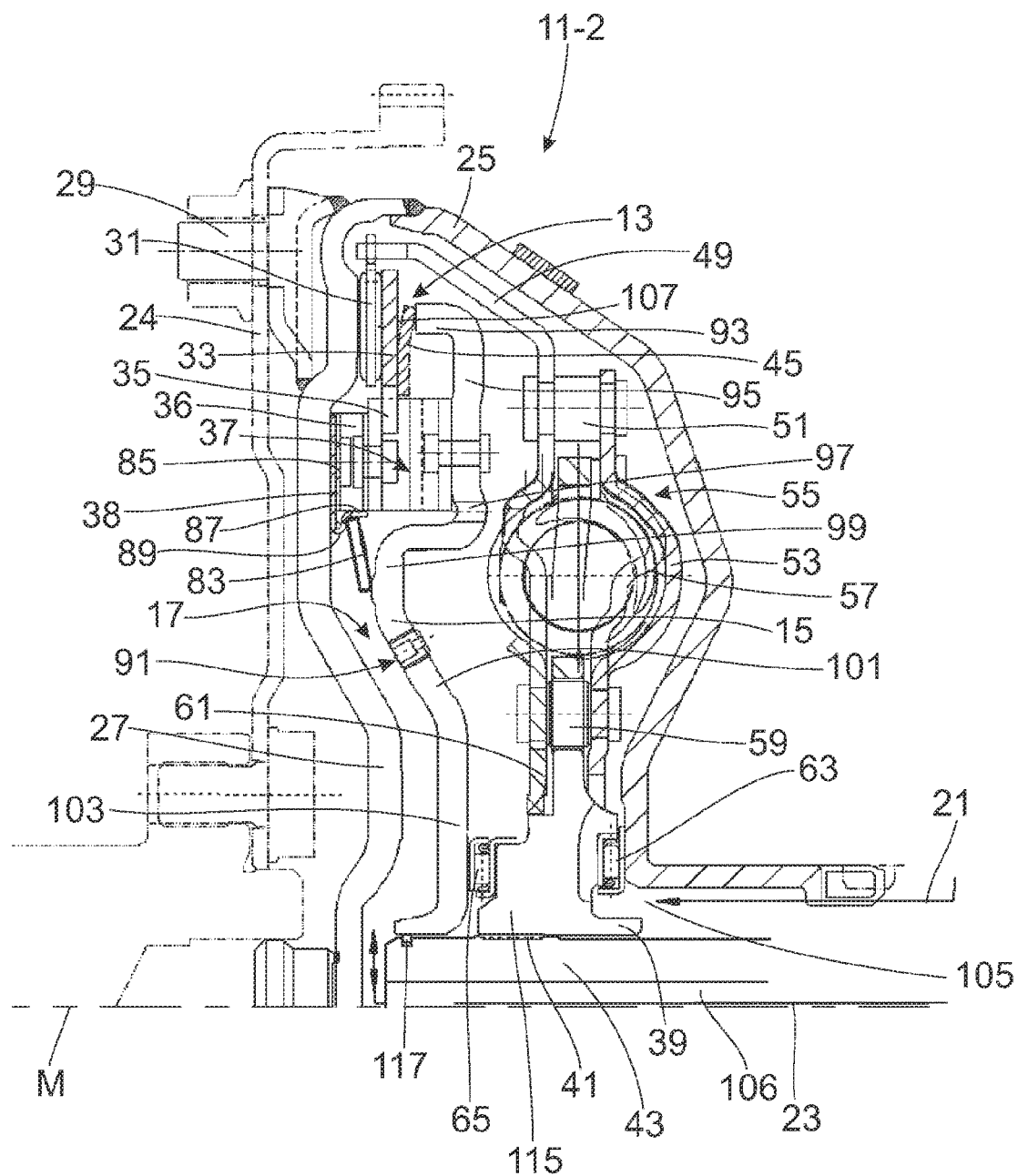
FIG. 3 is a schematic cross-sectional view through a starting element.

FIG. 3 shows a schematic cross-sectional diagram through a starting element 11-2 according to a further embodiment that is substantially similar to starting element 11-1 and likewise allows a swelling compensation.

In starting element 11-2, the piston 15 is supported and sealed directly on the transmission input shaft 43 instead of on a separate structural component part. A base 115 of the output component part 39 has a greater extension in an axial direction than in the embodiment examples described above. Since a relative rotational speed occurs between piston 15 and transmission input shaft 43 when the clutch is open, a seal 117 with a rectangular cross section is used, which also achieves a sufficient sealing effect with relative rotational speed of the two structural component parts with respect to one another. The second connection 21 is fluidically connected to the piston space 17 via a gap 119, which results in axial direction between housing shell 27 and transmission input shaft 43. The housing swelling has no effect on the plate air clearance in an operating point in which the friction clutch 13 is open because the piston 15 is supported on the transmission input shaft 43.

Figure 4:
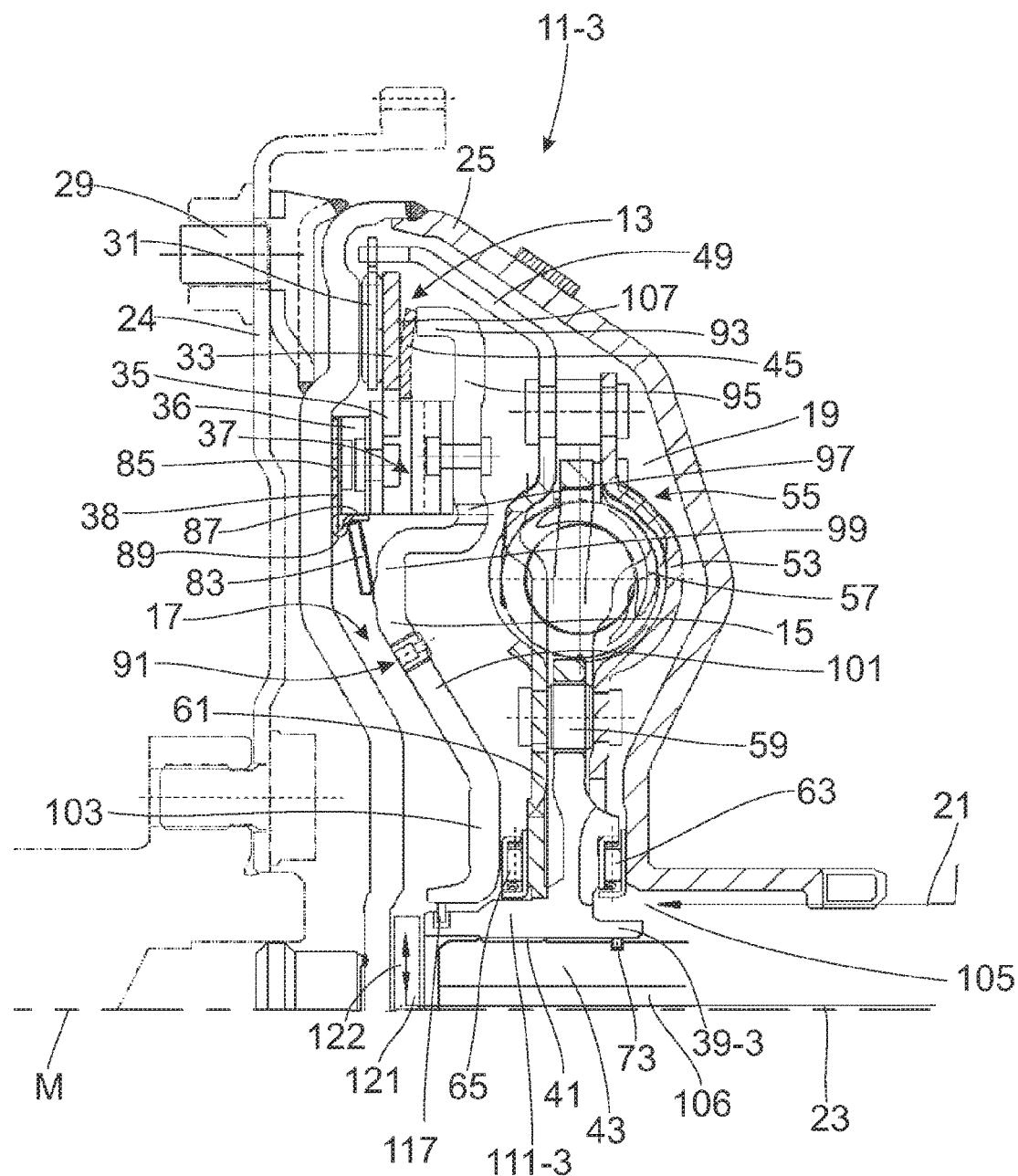
FIG. 4 is a schematic cross-sectional view through a starting element.

FIG. 4 shows a schematic cross-sectional view through a starting element 11-3 according to a further embodiment, which is substantially similar to starting element 11-2 and likewise allows a swelling compensation.

In this respect, the piston 15 is supported directly on the flange 111-3 of the output component part 39 or a hub of the vibration damper 55. The sealing is likewise carried out via seal 117. The head piece or another additional structural component part for supporting the piston 15 can again be dispensed with. Flange 111-3 has in axial direction toward the housing shell 27 arranged on the drive side a greater extension than the transmission input shaft 43. The transmission input shaft 43 can take a conventional form and does not require any special adaptation. The second connection 21 opens into the piston space 17 via a gap 121 between flange 111-3, transmission input shaft 43 and housing shell 27. Due to the fact that the piston 15 is supported on the flange 111-3, which can also be referred to as torsion damper flange hub, the housing swelling has no effect on the plate air clearance in the operating point for the friction clutch 13 or a "clutch open" status.

Figure 5:
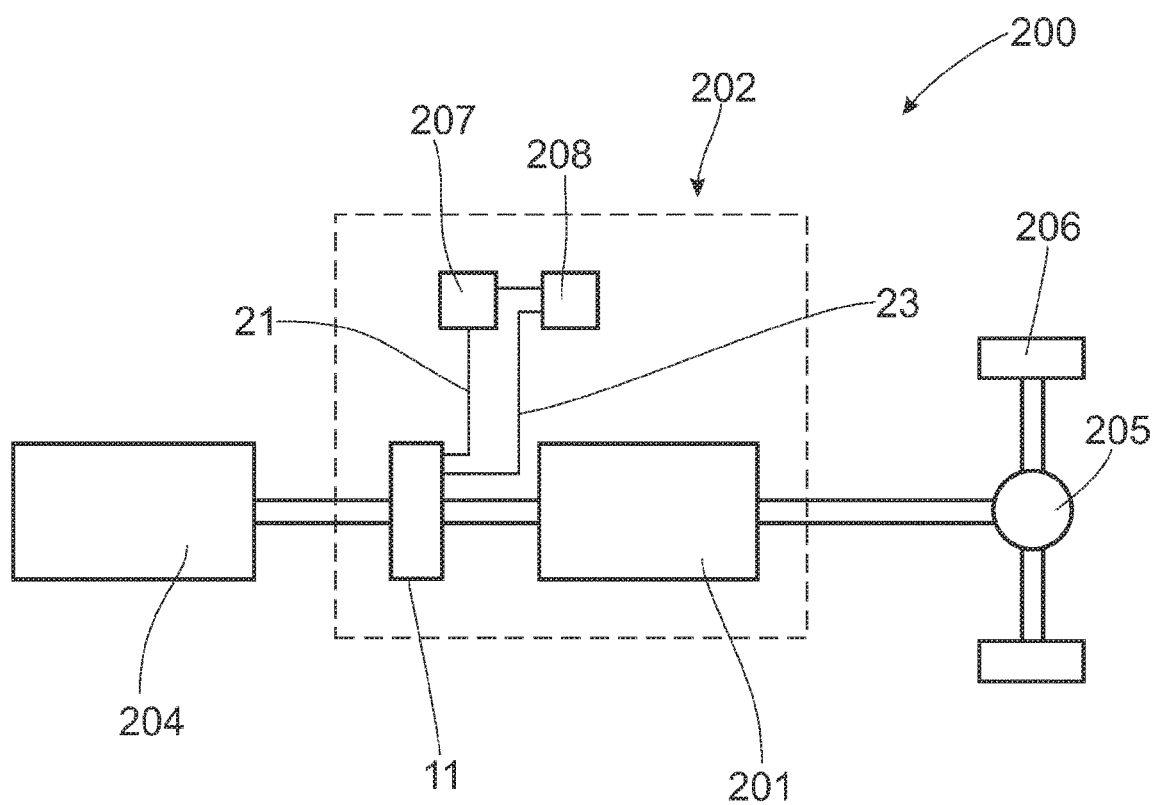
FIG. 5 is a schematic view of a drivetrain with a gearbox and a starting element.
Figure 6:
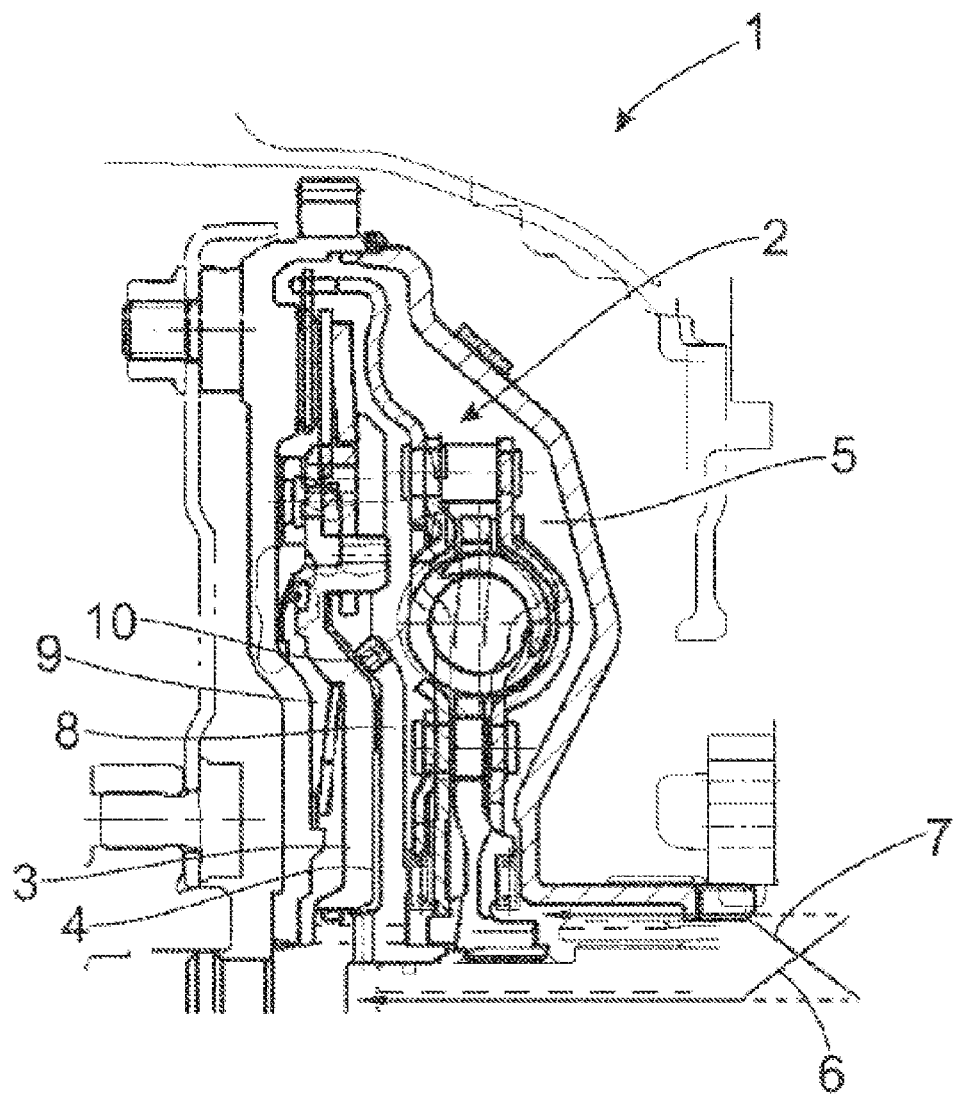
FIG. 6 is a schematic cross-sectional view through a conventional starting element.

FIG. 5 shows a schematic view of a drivetrain 200 with a gearbox 201 and a starting element 11 according to an embodiment example. The starting element 11 is arranged within the framework of a drivetrain 200 of a vehicle in order, for example, to transmit a torque supplied by a drive unit 204 to the gearbox 201 or another structural component part in a disconnectable manner or to disconnect a torque flow between the drive unit 204 and gearbox 201.

By guiding the connections 21 and 23 in parallel, i.e., without the connections 21 and 23 crossing one another, and by decoupling the structural component part on which the piston 15 is supported from the housing shell, it is first of all no longer necessary that the oil lines cross one another in the gearbox 201 for controlling the starting element 11. Accordingly, the starting element 11, which can also be referred to as starting clutch, can be controlled with the original shafts and oil pressure lines of the oil pump and gearbox in some embodiment examples. The control can also be carried out with the original or standard oil pressure level provided by the oil pump because any housing swelling which could occur does not lead to an axial displacement of the piston 15 as a result of the decoupling.

The drive unit 204 can be, for example, an internal combustion engine and/or an electric motor. Therefore, the starting element 11 can be used, for example, as disconnect clutch in case it is combined with a synchronized gearbox or also as a starting clutch in connection with an unsynchronized gearbox, for example, a corresponding automatic transmission. The gearbox 201 can be connected to the starting element 11 to form a gear unit 202. Gearbox 201 or gear unit 202 can include an oil pump 207 or a hydraulic pump which is fluidically connected via the first connection 21 and second connection 23 to the starting element 11 in the manner described above. The oil pump 207 can possibly communicate with a hydraulic reservoir 208. A torque can be transmitted from the gearbox 201 to a differential 205 and then to wheels 206 of the vehicle.

The embodiment examples disclosed in the preceding description, appended claims and accompanying drawings as well as the individual features thereof can be significant and can be implemented individually as well as in any combination for realizing an embodiment example in its various embodiments.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A starting element comprising:
a friction clutch;
a piston configured to actuate the friction clutch;
a piston space that is separated from a residual space of the starting element at least partially by the piston;
a first connection constructed such that the piston is acted upon by a hydraulic medium proceeding from one side of the residual space;
a second connection that is fluidically connected to the piston space,
wherein a maximum pressure present at the second connection is equal to or less than a pressure present at the first connection; and
a preloading structure configured to preload the piston against a direction in which the hydraulic medium acts on the piston via the first connection and configured to seal the piston space,
wherein the piston space is sealed radially outwardly via the preloading structure configured as the sealing element.

2. The starting element according to claim 1, wherein at least one of:
the first connection is arranged radially outside of the second connection and
the first connection and the second connection are arranged such that their respective projections are arranged in a nonintersecting manner around an axis of rotation of the starting element.

3. The starting element according to claim 1, wherein the first connection is an inlet and the second connection is an outlet.

4. The starting element according to claim 1, wherein the starting element comprises a two-line system, by which the hydraulic medium is exclusively supplied via the first connection as an input and the second connection as an outlet.

5. The starting element according to claim 1, further comprising:
a sealing element configured to seal the piston space between the piston, which is movable in axial direction, and a component part, which is immovable in axial direction, relative to the residual space.

6. The starting element according to claim 1, further comprising:
a choke connection arranged between the piston space and the residual space and configured to allow a smaller flow quantity to pass through than that which can be supplied via the first connection with pressure ratios remaining the same.

7. The starting element according to claim 6, wherein the choke connection is an opening in the piston.

8. The starting element according to claim 1, wherein the piston is supported on and fixed with respect to rotation relative to a cover hub connected to a housing of the starting element.

9. The starting element according to claim 1, further comprising:
a housing shell of the starting element that is decoupled from a structural component part on which the piston is guided in a radial direction and supported so as to be movable in axial direction.

10. The starting element according to claim 9, wherein the structural component part is a head piece that is supported radially outwardly of an output component part of the starting element and rotationally movable at the output component part of the starting element.

11. The starting element according to claim 9, wherein the piston is supported to be rotatably movable relative to the structural component part and/or the structural component part is a transmission input shaft and/or the structural component part is an output component part of the starting element.

12. A starting element, comprising:
a friction clutch;
a piston configured to actuate the friction clutch;
a piston space that is separated from a residual space of the starting element at least partially by the piston;
a first connection constructed such that the piston is acted upon by a hydraulic medium proceeding from one side of the residual space and
a second connection that is fluidically connected to the piston space,
wherein a maximum pressure present at the second connection is equal to or less than a pressure present at the first connection,
wherein a sealing element comprises a preloading structure configured to preload the piston against a direction in which the hydraulic medium acts on the piston via the first connection and seal the piston space.

13. One of a gearbox and a drivetrain having a starting element comprising:
- a friction clutch;
- a piston configured to actuate the friction clutch;
- a piston space that is separated from a residual space of the starting element at least partially by the piston;
- a preloading structure configured to preload the piston against a direction in which the hydraulic medium acts on the piston via the first connection and configured to seal the piston space, wherein the piston space is sealed radially outwardly via the preloading structure configured as the sealing element; and one of:
- i) a first connection constructed such that the piston is acted upon by a hydraulic medium proceeding from one side of the residual space and a second connection that is fluidically connected to the piston space, wherein a maximum pressure present at the second connection is equal to or less than a pressure present at the first connection, and
- ii) a contact spring arranged between the piston and the friction clutch in axial direction that transmits a torque from the piston to the friction clutch, wherein the contact spring has a greater friction radius with increasing piston pressure with increasing piston pressure through a greater average contact radius at one of a friction lining or a lining plate.

* * * * *